(12) United States Patent
Paul et al.

(10) Patent No.: US 8,371,528 B2
(45) Date of Patent: Feb. 12, 2013

(54) INTERCOSTAL FOR AN AIRCRAFT OR SPACECRAFT

(75) Inventors: Carsten Paul, Garstedt (DE); Marc Schimmler, Heinbockel (DE)

(73) Assignee: Airbus Deutschland GmbH, Hamburg (DE)

( * ) Notice: Subject to any disclaimer, the term of this patent is extended or adjusted under 35 U.S.C. 154(b) by 621 days.

(21) Appl. No.: 12/151,091

(22) Filed: May 2, 2008

(65) Prior Publication Data

US 2009/0321567 A1 Dec. 31, 2009

Related U.S. Application Data

(60) Provisional application No. 60/927,754, filed on May 4, 2007.

(51) Int. Cl.
*B64C 1/00* (2006.01)
*B64C 1/10* (2006.01)
(52) U.S. Cl. ........................ 244/119; 244/132

(58) Field of Classification Search .................. 244/131, 244/132, 129.1, 117 R, 119
See application file for complete search history.

(56) References Cited

U.S. PATENT DOCUMENTS

| | | | | |
|---|---|---|---|---|
| 5,806,797 | A * | 9/1998 | Micale | 244/120 |
| 6,003,812 | A * | 12/1999 | Micale et al. | 244/117 R |
| 6,315,250 | B1 * | 11/2001 | Meyer | 248/74.1 |
| 6,883,753 | B1 * | 4/2005 | Scown | 244/118.1 |
| 2006/0006284 | A1 * | 1/2006 | Vetillard et al. | 244/119 |

* cited by examiner

*Primary Examiner* — Timothy D Collins
*Assistant Examiner* — Brian M O'Hara
(74) *Attorney, Agent, or Firm* — Greer, Burns & Crain, Ltd.

(57) ABSTRACT

The present invention relates to an intercostals for an aircraft or space craft for diverting a load from a first rib to a second rib and/or a skin of the aircraft and/or space craft, with at least one opening region for guiding through system lines or the like, wherein the intercostal has a traverse that is movable at least between a first and a second position, wherein the traverse in the first position is provided for forming a force flow for diverting a load between the first rib and the second rib, and in the second position reveals the opening region from a predetermined side.

13 Claims, 6 Drawing Sheets

INTERCOSTAL FOR AN AIRCRAFT OR SPACECRAFT

FIELD OF THE INVENTION

This invention relates to an intercostal for an aircraft or spacecraft. The content of U.S. Provisional Application No. 60/927,754 filed May 4, 2007 is herein included by cross-reference.

BACKGROUND OF THE INVENTION

Such intercostals are also referred to as intermediate ribs. They are used to divert forces between ribs, for example door frame ribs and associated secondary ribs.

Intercostals have therefore been installed in the prior art in aircraft structures as a rigid unit, i.e. either in the classic differential design or, for example, as a machined integral component, for example with a continuous shear panel with reinforcing ribs. More recent designs provide for additional regions through which aircraft system lines can be guided, for example electric cables. In such designs construction space and weight are therefore saved.

FIG. 6 illustrates an intercostal 1 known to the applicant, in an elevation. In FIG. 6 it is fastened on the right side to a first rib 11 and on the left side to a second rib 12, wherein it is fitted with an underside by a skin connection 6 on inside I of an outer skin 10 of an aircraft or space craft. Outer skin 10 points with its other side towards outside A, which in FIG. 6 lies at the bottom. Intercostal 1 is fitted to first rib 11 by means of a first connection 4 and to second rib 12 by means of a second connection 5. Second connection 5 is fastened to a front fitting 15 which is reinforced on the other side of second rib 12 by a rear component 14. First rib 11 is, for example, a door frame rib, and second rib 12 is a secondary door frame rib. The intercostals has opening regions 9 which are designed either as bores or open compartments of a framework and through which system lines 23 are guided.

DE 10 2004 009 020 A1 describes an intercostals for aircraft for diverting a load from a first rib to a second rib and/or a skin of the aircraft and has a framework.

One disadvantage here consists in the fact that the enclosed opening regions for the system lines involve "threading" of the lines to be guided through them. In the case of a repair or maintenance the system must first be completely dismantled before the structure can be replaced. In some cases this gives rise to considerable costs, due among other things to the labour and down times of the aircraft.

SUMMARY OF THE INVENTION

Against this background one object of the present invention is to provide an intercostal for an aircraft or space craft which overcomes the above-mentioned disadvantages.

According to this invention this object may be achieved by a connection device with the features of Claim 1.

Accordingly an intercostals is provided for an aircraft or space craft for diverting a load from a first rib to a second rib and/or a skin of the aircraft and/or space craft, with at least one opening region for guiding through system lines or the like, which intercostal is characterised in that it has a traverse that moves at least between a first and a second position, wherein the traverse is provided in the first position for forming a force flow for diverting a load between the first rib and the second rib, and in the second position reveals an opening region from a predetermined side.

This invention therefore has the advantage that the opening regions in which system lines are arranged are easily accessible by either swivelling the moving traverse and in that it is at least partially or fully removable.

A further advantage of this invention consists in that the framework structure, with its advantages, is retained.

Advantageous embodiments and improvements of this invention are described in the dependent claims.

In one embodiment the intercostal has a base part which is fastened to the first rib, the second rib and/or to the skin, wherein the traverse is connected to the base part, the first rib and/or the second rib at least partially releasably and/or in a pivoting fashion. This division of the intercostal into two parts has the advantage that the base part can already be installed in the aircraft fuselage independently of the traverse, wherein the system lines can be laid independently of the fitting of the traverse.

In a further alternative embodiment provision is made for supporting bars are connected to the base part, the traverse, the first rib and/or the second rib together and/or to the base part at least partially releasably and/or in a pivotable manner and form a framework. An advantageous weight saving is achieved here. Furthermore, optimum force flow distribution is possible for different applications by combining the possibilities of the supporting bars.

It is preferable for the base part has a stringer connection for connection to a stringer. It is therefore possible to divert the forces to the skin not only in the fastening range of the base part but also distribute the forces over a stringer.

In a further alternative embodiment the traverse is constructed in a bar design allowing simple production thereof.

In a further alternative embodiment the traverse may have a support section with a releasable connection. The advantage of this is that the traverse is given a further support point to achieve greater stiffness and to allow for possible tilting.

It is preferable for the traverse to be adjustable, at least in its longitudinal axis. It is therefore possible, in a particularly advantageous manner, to compensate for tolerances in subsequent installation of the traverse in the case of a base part that is already installed.

In yet a further embodiment it is preferable for the traverse to be provided for fitting at least retaining elements for system lines to be guided through. It may also be provided with such retaining elements, thus enabling to be pre-assembled in a separate workplace, as a result of which little time is advantageously taken up with the traverses on the site and other installation work on the site is not impeded to any great extent.

In a further embodiment the releasable connections can be formed by means of a quick-locking device, thus enabling the opening/closing or removal/installation of the traverses to be carried out in an advantageously short time with minimal use of tools.

BRIEF DESCRIPTION OF THE DRAWINGS

The invention is explained in more detail in the following with reference to the exemplary embodiment shown in the diagrammatic figures of the drawing, in which.

DETAILED DESCRIPTION OF THE INVENTION

Figure 1:
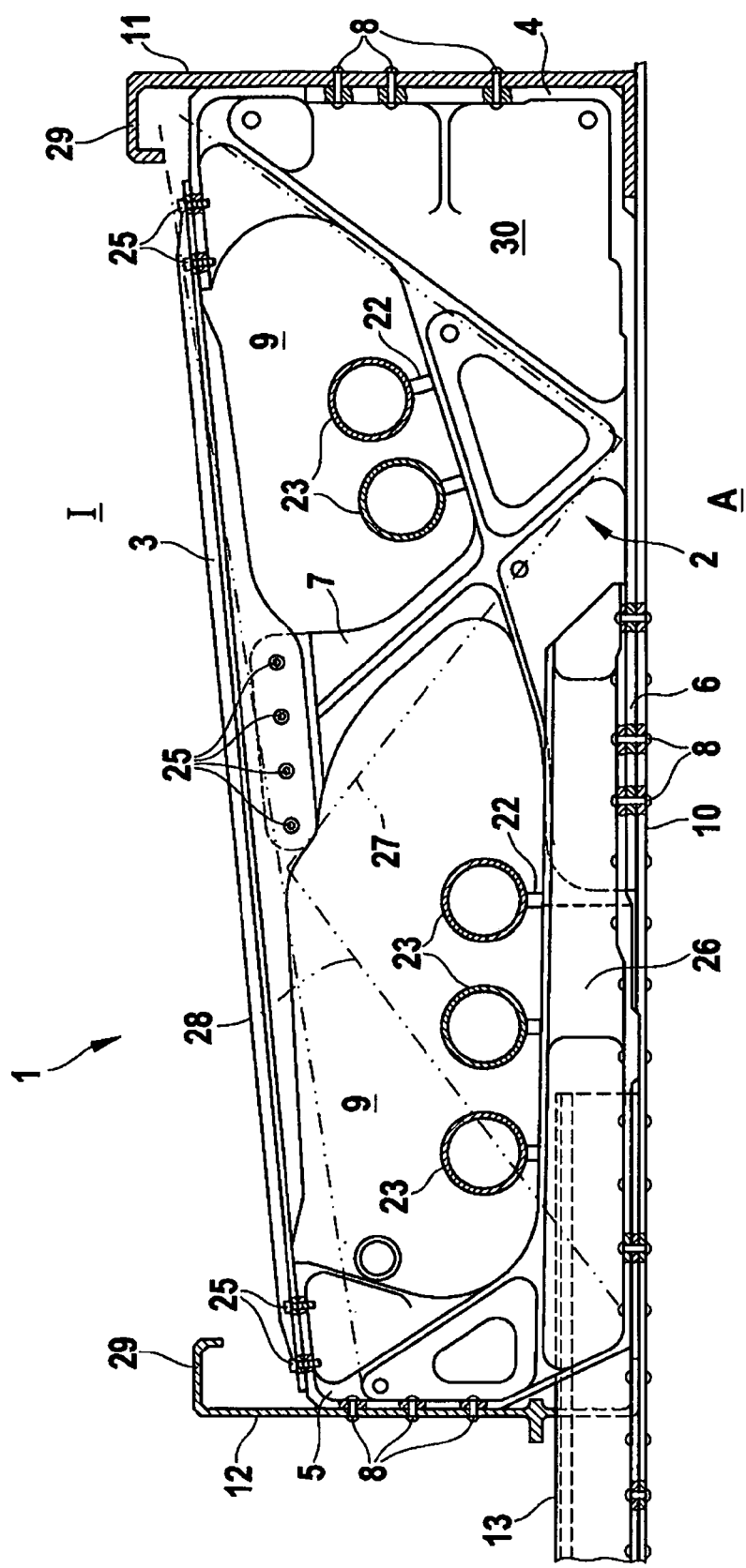
FIG. 1 shows a first embodiment of an intercostal according to the invention, in elevation, which is provided between two ribs of an aircraft or space craft.

In all the figures of the drawing the same or functionally similar elements have been provided with the same reference symbols, unless otherwise indicated.

Figure 6:
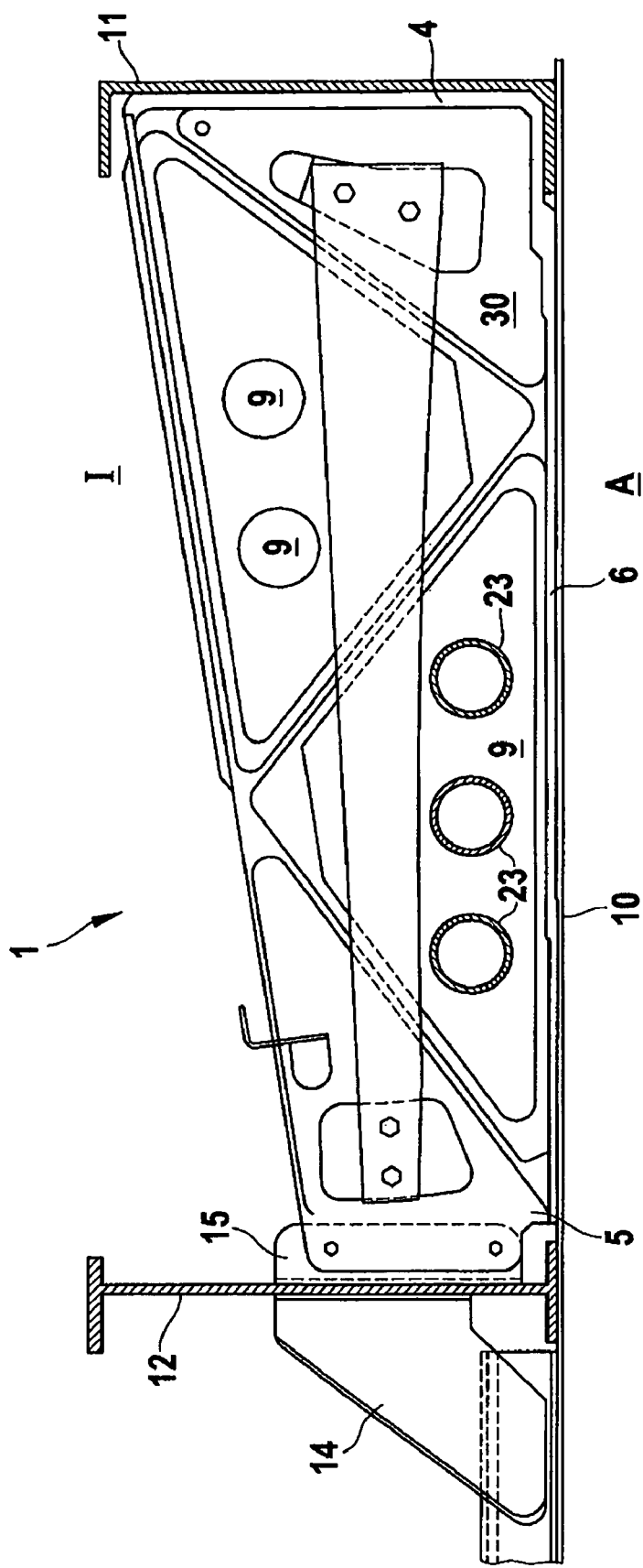
FIG. 6 shows an intercostal according to the state of the art, in elevation, which is provided between two ribs of an aircraft or space craft.

A conventional intercostal is described above in the introduction to the description with reference to FIG. 6.

FIG. 1 shows a first embodiment of an inventive intercostal 1, in elevation, between two ribs 11, 12 of an aircraft or space craft whose outer skin 10 is shown in the lower region of FIG. 1, in sections, and separates an inside I of the aircraft or space craft from an outside A.

First rib 11 is, for example, a door frame rib with corresponding door fittings, and second rib 12 is an associated secondary door frame rib which intercostal 1 connects. Here intercostal 1 is constructed of two parts. A base part is fitted with its underside by means of a skin connection 6 on the inside of outer skin 10 with fastening elements 8, rivets, for example, and is connected by means of a stringer connection 26 to a stringer 13. Base part 2 has on the right side a connection 4 to first rib 11, which forms part of a so-called shear triangle 30. First connection 4 is connected to first rib 11 by means of fastening elements 8, rivets for example. The main part of the doorstop loads is either guided from first rib 11 with this region of base part 2, or it is supported by it.

On the left side base part 2 has a second connection 5 communicating with second rib 12 to which it is fastened in a similar manner to first rib 11. This second connection 5 may also be a separate part in an alternative embodiment.

Approximately in the centre of base part 2, the latter is formed integrally with a strut 7 which points towards inside I and has fixing points on its upper side for connecting elements 25 with a traverse 3. This traverse 3 is fitted with one end, shown on the right side in FIG. 1, to base part 2 in the vicinity of the so-called inner belt 29 of first rib 11. The other end of traverse 3 is fitted to second connection 5 of base part 2 close to second rib 12. The fitting points of traverse 3 are constructed with connecting elements 25 which are, for example, screws/nut connections or bolted connections, so that these connections are releasable, traverse 3 being fitted so that it is removable.

In a first position of traverse 3, shown in FIG. 1, traverse 3 is fitted to base part 2. In this case it forms a connection from inner belt 29 of first rib 11 to second rib 12. The connection to strut 7 serves, among other things, to increase stiffness and as a measure against tilting.

In a first position traverse 3 seals two opening regions 9 between first connection 4 and strut 7, and between strut 7 and second connection 5 towards inside I. Inside these openings 9 are arranged system lines 23 which are, for example, electric cables or pipes for fluids and the like.

Figure 2:
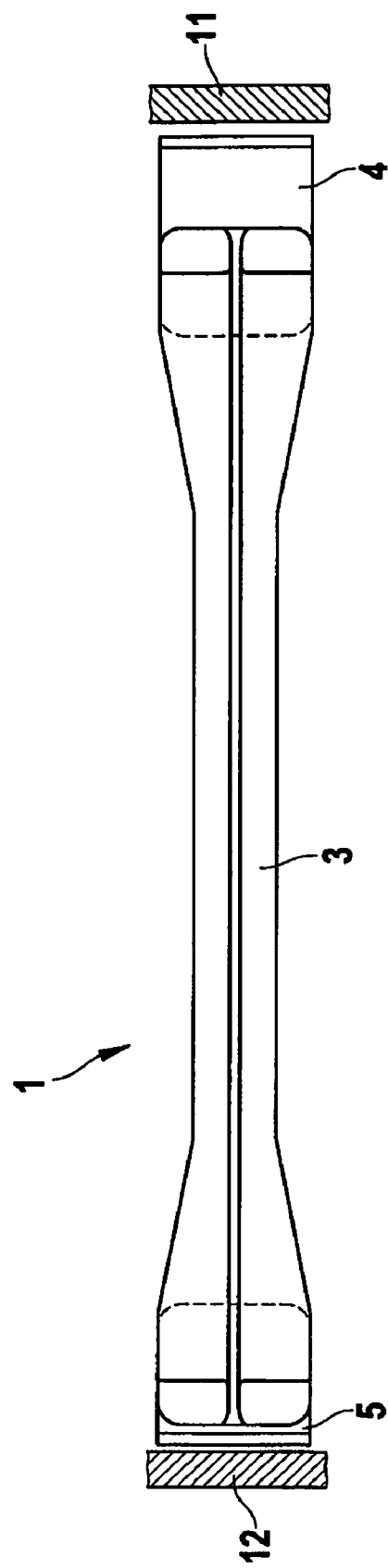
FIG. 2 shows a view of the intercostal according to FIG. 1 from inside I.

In a second position of traverse 3, not shown in FIG. 1, it is removed from its connection points so that opening regions 9 are accessible towards inside I. In this second position of traverse 3, system lines 23 can be easily inserted in opening regions 9 from the inside and there fastened by suitable means. Threading in in an axial direction perpendicular to the drawing plane is therefore no longer necessary In this first embodiment base part 2 and traverse 3 are cut parts, where traverse 3 can be designed, in its width, so that it is on the one hand adequately dimensioned for the transmission and introduction of forces, and on the other hand happens to have a low material weight. Such a design is represented as an example in FIG. 2 in a view from inside I shown in FIG. 1.

Figure 3:
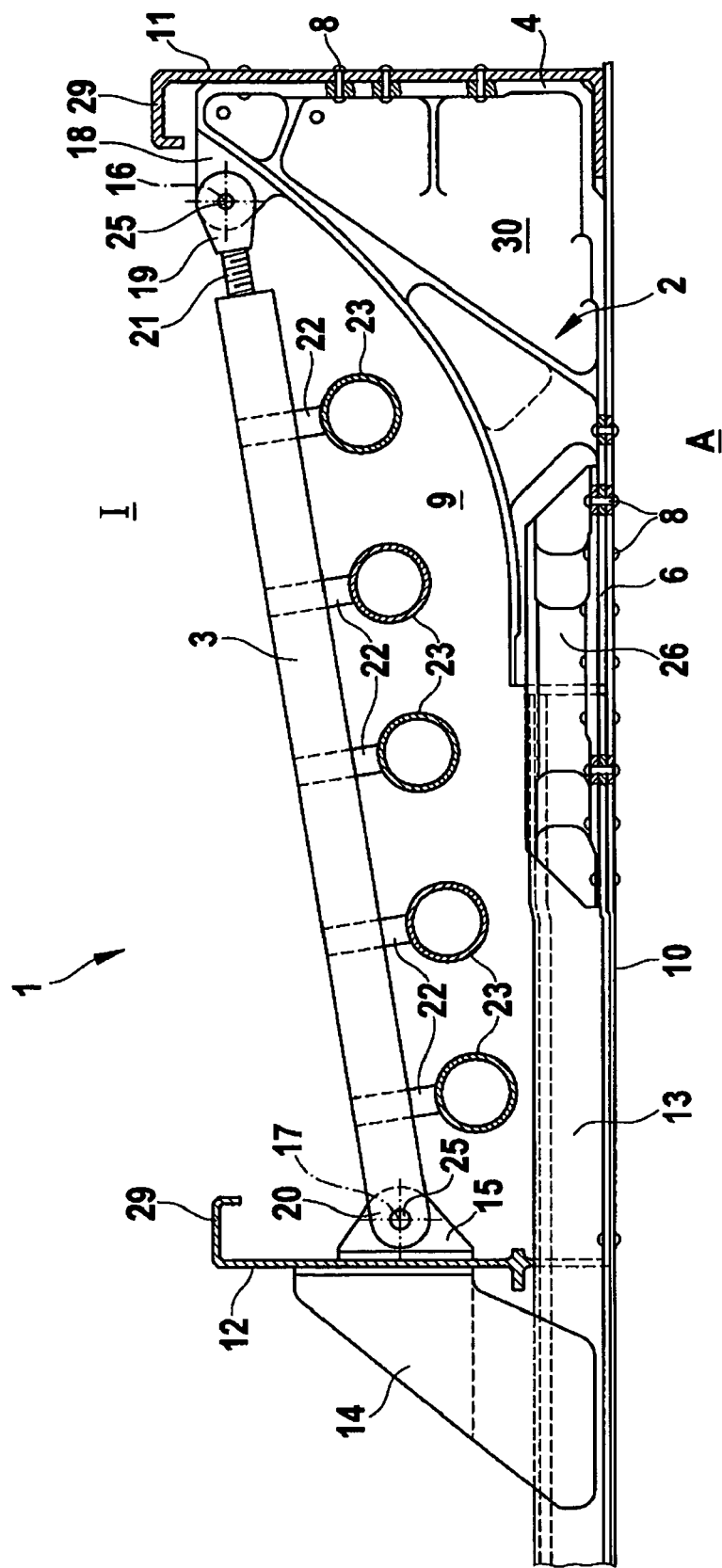
FIG. 3 shows a second embodiment of an intercostals according to the invention, in elevation, which is provided between two ribs of an aircraft or space craft.

A second embodiment of a design of intercostals 1, with a cut base part 2 and a traverse 3, is illustrated in bar form in FIG. 3.

Base part 2 has first connection 4 as part of a shear triangle 30 and a main connection 6 to skin 10 of the aircraft or space craft, as in the first embodiment shown in FIG. 1. The lower side of base part 2 is, however, only approximately half as long as the distance between ribs 11 and 12, and has stringer connection 26 to stringer 13.

Figure 4:
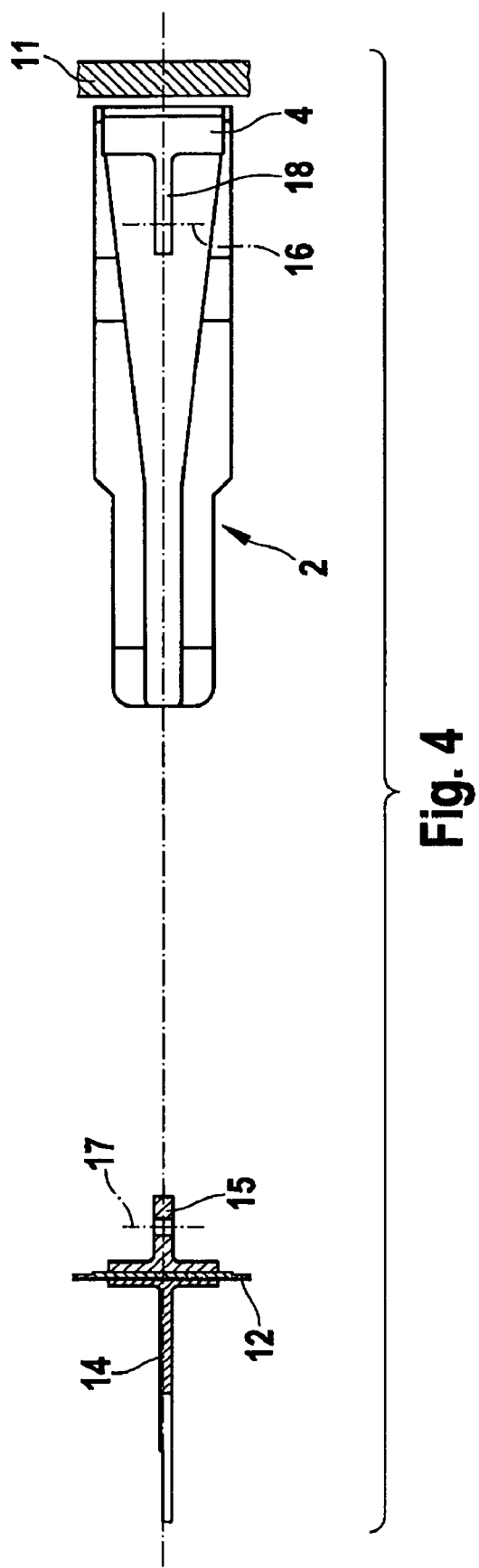
FIG. 4 shows a view of the intercostal according to FIG. 3 without a traverse, from inside I.

A bearing support 18, also described as an eye, is formed on the section of base part 2 lying on inner belt 29 of first rib 11. Traverse 3 is articulated by means of a releasable connecting element 25 to bearing support 18 with a first fork head 19 so that it is pivotable about a first swivel axis 16. In this first position traverse 3 connects inner belt 29 of a first rib 11 to second rib 12, the other end of traverse 3 being pivotably articulated, with a second fork head 20, by means of a further releasable connecting element 25, to a front fitting of second rib 12. Second rib 12 is stiffened with a rear component 14 in the region of the articulation of traverse Traverse 3 is, in its second position, either removed, as shown in FIG. 4 in a similar manner to FIG. 2, or is pivoted about a swivel axis 16, 17. This means that in the swivelled position only one connecting element 25 is removed and that traverse 3 is pivotable about the remaining articulation point, namely first or second swivel axis 16, 17, so that opening region 9, which is formed by it, base part 2, in this example by stringer 12 and a section of second rib 11 in the first position of traverse 3, is rendered accessible, as described above.

In this second embodiment according to FIG. 3, system lines 23 are fitted on brackets 22 on traverse 3. When traverse 3 is pivoted these are pivoted with it and are extremely easily accessible. It is also possible for traverse 3 to be formed integrally with brackets 22 or to have quick-release connections for brackets 22, or both. Furthermore, it is particularly advantageous for system lines 23 to be pre-assembled elsewhere with traverse 3 separately from the site of installation in the aircraft and space craft, and for them to be installed together on the site in a short time. Consequently the time-consuming work of fitting system lines 23 to brackets 22 is not carried out on site and this time is available for other installation work, thereby shortening the total production time.

In this example traverse 3, in bar form, has a female thread with a screwed in spindle 21 on whose outer end there is first fork head 19. This renders a tolerance compensation possible a simple matter by adjusting the length of traverse 3, which may be necessary, for example, in the case of replacement traverses that are subsequently installed.

Figure 5:
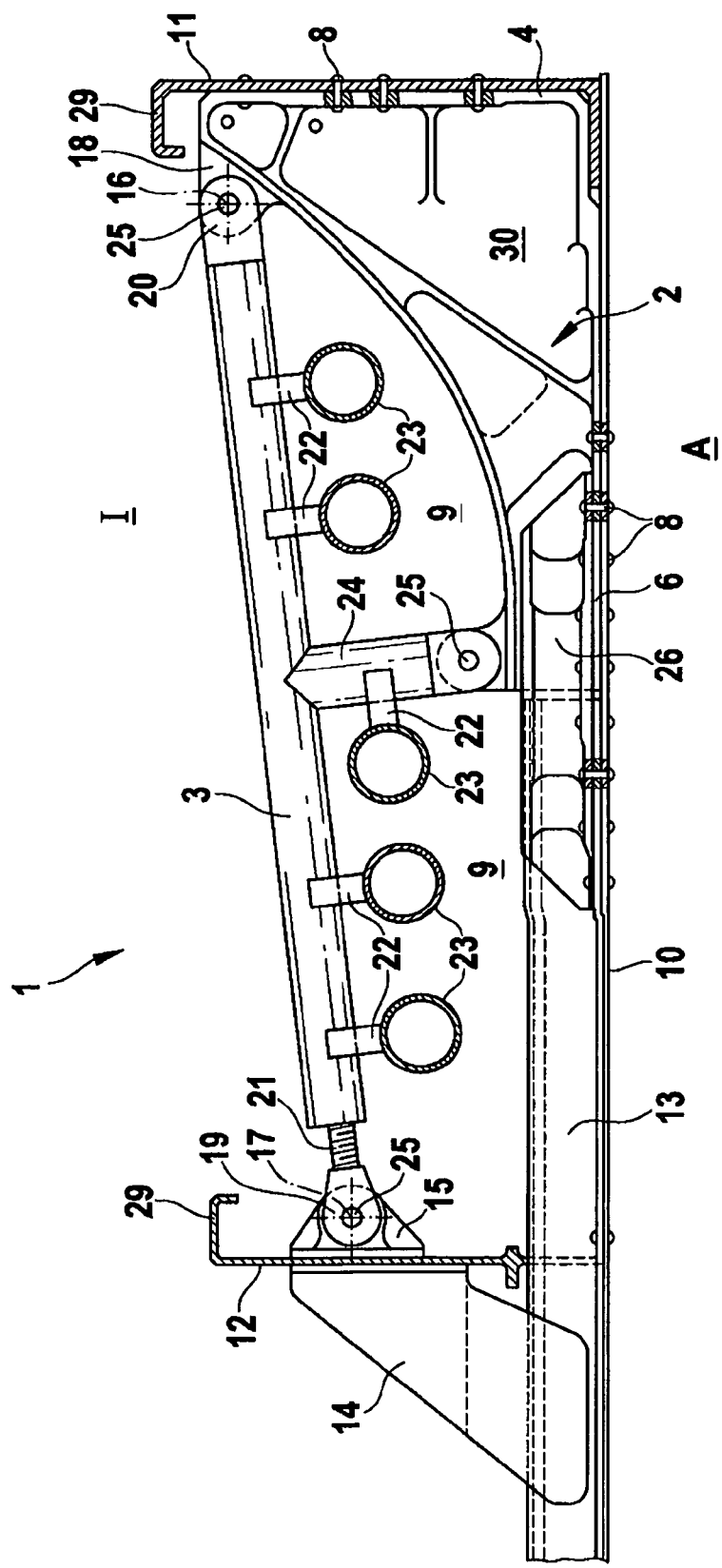
FIG. 5 shows a third embodiment of an intercostal according to the intervention, in elevation, which is provided between two ribs of an aircraft or space craft.

A third embodiment of the inventive intercostal 1 is shown in FIG. 5, which is similar to the second embodiment and differs from it only in that traverse 3 is designed approximately in the centre with a support section 24 which is connected releasably to a further eye of base part 2. Additional fitting space for system lines 23 is created on support section 24 in this example. Support section 24 serves to increase stiffness and prevents tilting of traverse 3 in certain load cases.

This third exemplary embodiment according to FIG. 5 shows traverse 3 in a position that is the reverse of that shown in FIG. 3, first fork head 19 being connected to second rib 12 in the first position of traverse 3.

Support section 24 can also be designed so that it is adjustable in its longitudinal direction for tolerance compensation in the manner described above.

The material of the bar components may consist, for example, of one or more of the following materials: metal, plastic, fibre materials (for example, carbon fibre reinforced plastic, glass fibre reinforced plastic, wood, etc.

The invention is not limited to the exemplary embodiments described above.

For example, a fourth embodiment is possible, illustrated in FIG. 1. In this case support bars 27, 28 (dash-double dotted lines) are provided which, together with base part 2 (here first connection 4 with shear triangle 30), traverse 3 and left connection 3 form a framework. Here traverse 3 and support bars 27, 28 are designed in bar form, as described in FIGS. 3 and 5, and are connected releasably to each other, only base part 2 and left connection 5 (either as part of base part 2 or as a separate part) are fixedly connected to ribs 11, 12, skin 10 and stringer 13. In this case the advantages of a framework are particularly beneficial in terms of force distribution and transmission, as well as simple installation, releasability and pivotability.

What is claimed is:

1. An intercostal for an aircraft or spacecraft for diverting a load
   from a first rib to a second rib of the aircraft or spacecraft, comprising:
   a base part secured to the first rib, the second rib and a skin of the aircraft;
   wherein a lengthwise direction of the base part is oriented in a longitudinal direction of the aircraft or spacecraft,
   wherein the ribs are secured to the skin, and are oriented perpendicular to a longitudinal direction of the aircraft or spacecraft,
   a plurality of stringers,
   wherein a lengthwise direction of the stringers is oriented in longitudinal direction of the aircraft or spacecraft,
   a traverse connected to the base part, the first rib and/or the second rib at least partially releasable and/or pivotable; and
   at least one opening region arranged between the base part and the traverse for guiding through system lines,
   wherein the traverse is movable at least between a first and a second position,
   wherein the traverse in the first position forms a force flow for diverting the load between the first rib and the second rib and in the second position makes the at least one opening region accessible towards an inside of the aircraft or spacecraft,
   wherein the traverse is provided for fitting at least one retaining element for system lines to be guided through; and
   wherein the traverse is formed integrally with the retaining element.

2. The intercostal according to claim 1,
   wherein the intercostal comprises support bars,
   wherein the support bars are connected releasably with the traverse,
   wherein the base part has a second connection, through which the base part is fixedly connected to the second rib, and
   wherein the support bars, the transverse, the base part, and the second connection form a framework.

3. The intercostal according to claim 1, wherein the base part has a stringer connection for connecting to a stringer.

4. The intercostal according to claim 1, wherein the traverse is designed so that it is pivotable about a swivel axis.

5. The intercostal according to claim 1, wherein the traverse is designed so that it can be removed completely or at least partially.

6. The intercostal according to claim 1, wherein the traverse is constructed in a bar design.

7. The intercostal according to claim 1, wherein the traverse has a support section with a releasable connection.

8. The intercostal according to claim 7, wherein the releasable connections are designed as screw-nut connections and/or bolts.

9. The intercostal according to claim 7, wherein the releasable connections have a quick-locking device.

10. The intercostal according to claim 1, wherein the traverse is adjustable along the longitudinal direction of the aircraft.

11. The intercostal according to claim 1, wherein the intercostals are formed from machined components and/or bar components.

12. An intercostal for an aircraft or spacecraft for diverting a load from a first rib to a second rib of the aircraft or spacecraft, comprising:
    a base part secured to at least the first rib and a skin of the aircraft or spacecraft;
    wherein a lengthwise direction of the base part is oriented in a longitudinal direction of the aircraft or spacecraft,
    wherein the ribs are secured to the skin, and are oriented perpendicular to a longitudinal direction of the aircraft or spacecraft,
    a plurality of stringers, wherein a lengthwise direction of the stringers is oriented in longitudinal direction of the aircraft or spacecraft,
    a traverse releasably connected near a first and second end thereof to the first and second ribs, respectively, either directly or through the base part, and
    at least one opening region arranged between the base part and the traverse for guiding through system lines,
    wherein the traverse is movable upon release of at least one of the ends of the traverse at least between a first and a second position,
    wherein the traverse in the first position forms a force flow for diverting the load between the first rib and the second rib and in the second position makes the at least one opening region accessible towards an inside of the aircraft or spacecraft and
    wherein the traverse is provided for fitting at least one retaining element for system lines to be guided through, and
    wherein the traverse is formed integrally with the retaining element.

13. The intercostal according to claim 12, wherein at least one end of the traverse is connected in a pivotable manner.

* * * * *